Figures 1, 2:
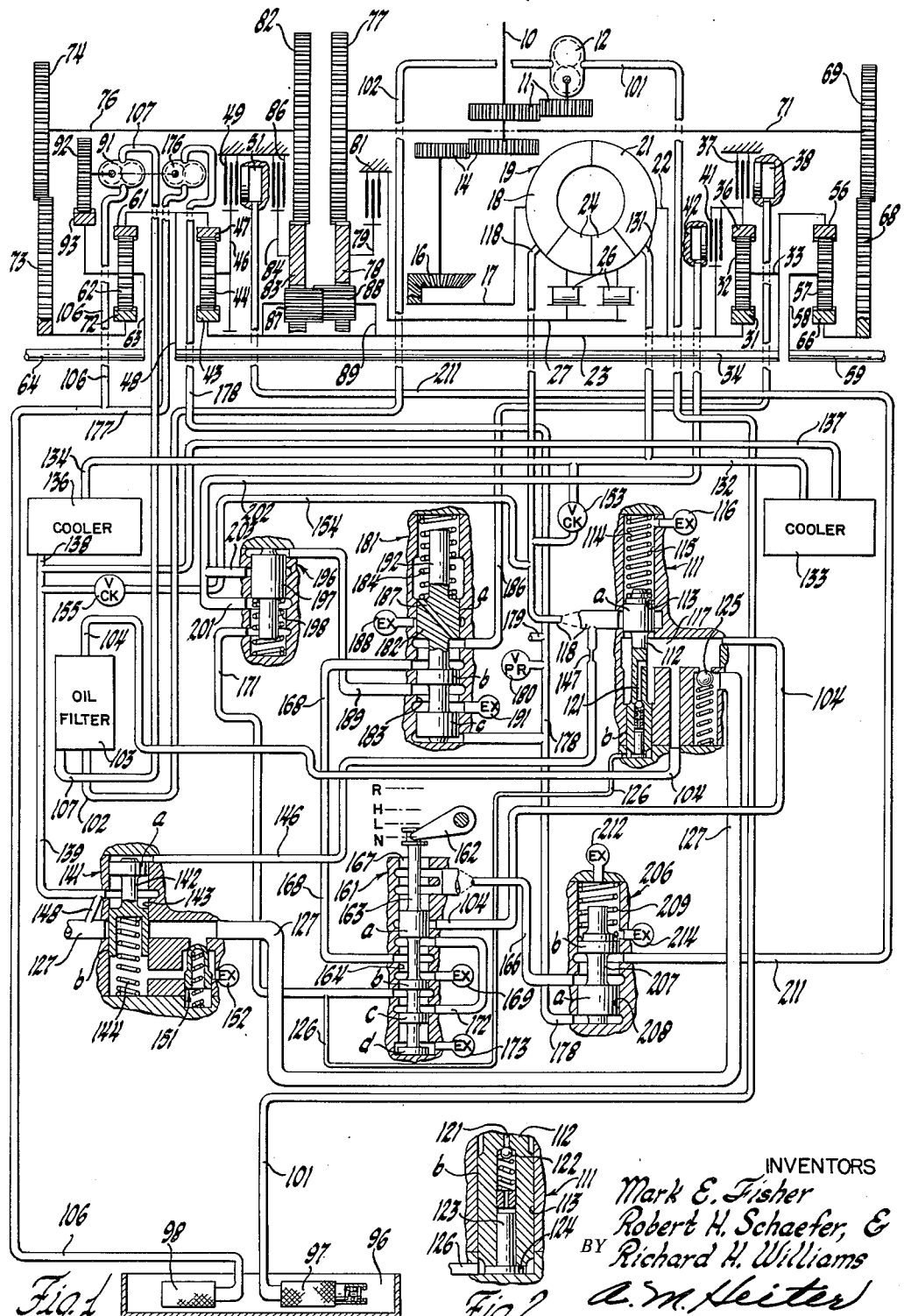

Oct. 19, 1965  M. E. FISHER ETAL  3,212,360
TRANSMISSION
Filed Aug. 15, 1960

INVENTORS
Mark E. Fisher
Robert H. Schaefer, &
Richard H. Williams
BY
A. M. Heiter
ATTORNEY United States Patent Office 3,212,360
Patented Oct. 19, 1965

3,212,360
TRANSMISSION
Mark E. Fisher, Carmel, Robert H. Schaefer, Westfield, and Richard H. Williams, Indianapolis, Ind., assignors to General Motors Corporation, Detroit, Mich., a corporation of Delaware
Filed Aug. 15, 1960, Ser. No. 49,669
16 Claims. (Cl. 74—731)

This invention relates to transmissions and particularly to a multiratio transmission and control system.

The invention is illustrated in a cross-drive transmission having a torque converter, a gear unit providing two forward speed ratios and one reverse ratio in the drive train and differential control of reaction gearing for steering. The main line regulator valve controls the pressure of the fluid supplied to the transmission control system and supplies the excess fluid to the torque converter. The torque converter outlet line is connected through a cooler to a converter pressure regulator valve which regulates the exhaust from the converter and cooler in accordance with the converter inlet pressure. A converter bypass check valve connects the converter inlet line to the converter outlet line to limit the pressure differential between the higher converter inlet pressure and the lower converter outlet pressure to control converter pressure and limit the flow rate. The cooler outlet line is also connected by a one-way check valve to the converter inlet line to relieve excess pressure generally due to cold oil in the cooler outlet and lubrication lines.

The multiratio gear unit is controlled by a manual selector valve which provides under normal shifting conditions neutral, reverse, low and high ratio drive in these valve positions. Automatic pre-select controls are provided that allow the driver to downshift the manual selector valve to a lower speed but prevent shifting of the transmission until the proper vehicle speed is obtained. Once the proper vehicle speed is obtained, the transmission is shifted to the lower ratio and will not automatically upshift in response to a later increase of vehicle speed. Reverse ratio cannot be engaged when the vehicle is moving at any appreciable forward speed.

An object of the invention is to provide in a transmission having a low and a high forward drive and a reverse drive a manual selector valve normally operable to engage these ratios and over-control valves to prevent engagement of low on a manual downshift to low above a predetermined speed, and to automatically maintain high ratio engaged and a reverse inhibitor valve to prevent engagement of reverse above a significant forward speed.

An object of the invention is to provide in a transmission, having a manually controlled multiratio gear unit, a speed responsive control operative on a manual downshift to maintain the higher ratio engaged until the vehicle operates at the proper speed and thereafter to maintain the transmission in the lower ratio.

Another object of the invention is to provide in a torque converter, a fluid pressure supply system and a regulator valve to control the outlet pressure proportional to the inlet pressure.

These and other objects of the invention will be more apparent from the following description and drawing of a preferred embodiment of the invention.

FIGURE 1 diagrammatically shows the transmission.
FIGURE 2 is an enlargement of part of the regulator valve.

The invention is illustrated in a cross-drive transmission arrangement having an input shaft 10 which is connected through a speed multiplication spur gear set 11 to drive the input pump 12 and through a speed multiplication spur gear set 14 and the beveled gear set 16, to drive the input sleeve shaft 17. The input sleeve shaft 17 drives the pump 18 of a torque converter 19. The pump 18 drives the torque converter turbine 21 which is connected by a hub 22 to the input cross-shaft 23. The torque converter has stators 24 connected by suitable one-way brakes 26 to the ground sleeve 27 which is fixed to the frame to provide the reaction for the fluid circulating in the torque converter. The torque converter provides torque multiplication between the input and cross-shaft 23 in the conventional manner.

In input cross-shaft 23 drives the sun gear 31 of the two-speed planetary gear set having pinions 32 mounted on a carrier 33 fixed to the output cross-drive shaft 34. The pinions 32 mesh with a ring gear 36 which may be held stationary to provide low ratio by the brake 37. The multiplate brake 37 is engaged by the fluid motor 38 consisting of an annular piston and cylinder. The high clutch 41 is engaged to connect the ring gear 36 to the sun gear 31 to provide lockup of the planetary gear set for high or direct drive. The clutch 41 is actuated by the high motor 42 which consists of a piston and a cylinder.

To provide reverse drive the input cross-shaft 23 is connected by sun gear 43 to the pinions 44 mounted on a carrier 46. The pinions 44 mesh with the ring gear 47 connected by the hub 48 to the output cross-shaft 34. When the carrier 46 is held by a reverse brake 49 which is actuated by the reverse motor 51, reverse drive is engaged. Fluid is selectively supplied to the low, high and reverse motors to engage the low brake, high clutch and reverse brake. The low, high and reverse motors have suitable retraction springs (not shown) to disengage the brakes and clutch when the fluid is exhausted from the motors.

The output cross-shaft 34 is also connected by the carrier 33 to the right output ring gear 56 which meshes with the pinions 57 rotatably mounted on the right output carrier 58. The carrier 58 is drivingly connected by the right output shaft 59, which drives the right traction member, such as a track. At the left side of the vehicle the output cross-shaft 34 is connected by the hub 48 to the left output ring gear 61 which meshes with the pinion 62 rotatably mounted on the output carrier 63. The left output carrier 63 is drivingly connected to the left output shaft 64, which drives the left propulsion unit, such as a track.

The right output pinions 57 and the left output pinions 62 are connected by reaction steer control gearing. The right output pinions 57 mesh with the reaction sun gear 66 which is drivingly connected to reaction spur gear 68. The spur gear 68 meshes with a gear 69 drivingly connected to the right reaction shaft 71. The left output pinions 62 mesh with a left reaction sun gear 72 which is drivingly connected to the left reaction spur gear 73. The spur gear 73 meshes with the spur gear 74 fixed to the left reaction shaft 76. The right reaction shaft 71 is drivingly connected to the right reaction control gear 77 which meshes with the external teeth on ring gear 78 rotatably mounted and having a hub 79 which may be retarded by the right steering brake 81. The left reaction shaft 76 is drivingly connected to the left reaction control gear 82 which meshes with the external teeth of ring gear 83 having a hub 84. The hub 84 may be retarded by the left steering brake 86 to hold ring gear 83 for left steering. A pair of intermeshing differential spur pinions 87, 88 are mounted on carrier 89 fixed to shaft 23. Pinion 87 meshes with the internal teeth of ring gear 83 while pinion 88 meshes with the internal teeth of ring gear 78. Pinions 87–88 also mesh with each other. This differential arrangement normally provides equal reaction for straight forward drive and on engaging one steering brake 81 or 86 retards or holds one reaction sun gear and drives the other to provide steering.

Hydraulic controls

The hydraulic control system is supplied with fluid under pressure by a front pump 12 driven by the input shaft 10 and a rear pump 91 driven by the spur gear 92 which meshes with a ring gear 93 fixed to the carrier 63 on one of the output shafts, such as the left output shaft 64. The sump normally located in the bottom of the transmission housing is diagrammatically indicated by the sump 96 which is normally filled with sufficient fluid to cover the intake strainers 97 and 98. The pump 12 draws fluid through the strainer 97 and the front pump inlet line 101 and supplies fluid under pressure to the front pump outlet line 102 which is connected through the filter 103 to the main line 104. The rear pump 91 draws fluid through the strainer 98 and the rear pump inlet line 106 and supplies fluid under pressure to the rear pump outlet line 107 which is also connected through the filter 103 to the main line 104.

Regulator valve

Main line 104 is connected to the main line regulator valve 111 which has a valve element 112 having a large land *a* and a smaller *b* fitting in a stepped bore 113. The large end portion of the bore provides a spring chamber 115 for the spring 114 which abuts against one end of the bore and land *a* of valve element 112. The spring chamber is provided with an exhaust 116 permitting fluid to return to the sump to prevent an accumulation of fluid in the spring chamber interferring with the operation of the valve. The fluid under pressure supplied by the input driven and output driven pumps is connected by line 104 to port 117 where it acts on the unbalanced area of lands *a* and *b* to move valve element 112 upwardly against the biasing force of spring 114. The regulator valve 111 will normally regulate the pressure at a higher value preferably 182–210 p.s.i. and exhaust the excess to the converter supply line 118.

The regulating action of valve 112 is damped. The main line 104 at port 117 is connected through a bore 121 in the valve element 112 which extends from the reduced diameter portion between lands *a* and *b* through land *b* to the lower end of the valve. A ball check valve 122 consisting of a ball and spring, as best shown in FIGURE 2, is located in this passage to permit rapid flow from port 117 through bore 121 to act on the pin 123 which closes the lower end of bore 121. Ball check valve 122 provides a rapid flow from the main line to act on pin 123 and a restricted return flow to provide a damping action effected by the fluid pressure acting on pin 123 and holding the head of the pin 124 in contact with the lower end of the valve bore 113. The restricted return flow is provided by any conventional means, preferably by forming the ball and seat of valve 122 so there is a little or restricted leakage, or by a suitable orifice in the valve body or element.

When the selector valve is placed in the high position, fluid is supplied to the high signal line 126 which is connected to the lower end valve bore and acts upwardly on the land *b* and head 124 of pin 123 sealing face of head 124 to the end of land *b* to close the bore 121, to assist the action of the main line pressure lifting the valve element 112 to regulate the pressure at a reduced value, for example 125 to 140 p.s.i. At the main line regulator valve 111 the main line 104 is also connected to a ball type safety valve 125 which at an excessively high pressure, for example 250 p.s.i., exhausts fluid from the main line 104 to the lubrication line 127.

Converter supply

The converter supply line 118 is connected to supply fluid to the torque conveter 19 and circulate fluid through the converter operating chamber to the converter outlet line 131 which is connected by a right branch 132 to the right cooler 133 and a left branch 134 to the left cooler 136. The right cooler outlet line 137 and the left cooler outlet line 138 are connected by the cooler outlet line 139 to the converter pressure regulator valve 141. The converter pressure valve 141 has a valve element 142 having lands *a* and *b* of equal diameter located in a bore 143. The valve element 142 is urged to the closed position shown by spring 144 and urged in the opposite direction by converter inlet pressure supplied by the converter pressure signal line 146 to the closed upper end of bore 143 to act on the land *a* to urge the valve element 142 toward the open position. An orifice 147 in the converter inlet pressure signal line 146 damps the action of the converter regulator pressure valve 141. With the regulator valve 141 in the position shown the cooler outlet flow in line 139 passes through restricted passage 148 to the lubrication line 127 and to the bore 143 where it is blocked between the lands *a* and *b*. Since these lands have the same area, the cooler outlet pressure does not tend to move valve element 142. On an increase in the converter supply pressure in line 118 above a predetermined value which would increase the pressure in the conveter operating chamber above the desired value, the pressure in signal line 146 acts on the land *a* to open the valve to connect the cooler outlet line 139 through an unrestricted passage to the lubrication line 127. The pressure in the lubrication line 127 is limited by a relief valve 151 to a low lubricating pressure, for example 40 p.s.i., and the excess connected to exhaust 152 and returned to the sump. The spring chamber portion of bore 143 is also connected to exhaust 152 to prevent accumulation of fluid.

The converter supply line 118 is connected by a converter bypass relief and check valve 153 to the converter outlet line 131–132–134 to maintain the desired small pressure differential between the converter inlet and outlet, for example 5 p.s.i., to maintain the desired flow rate through the converter operating chamber. In order to protect the coolers and converter against excessive pressures due to cold oil in the system, and particularly the lubricating system, a bypass line 154 having a check valve 155 connects the main cooler outlet line 139 to the converter inlet line 118 to insure that the pressure in the cooler outlet line does not exced the pressure in the converter supply line. Values 153 and 155 may be constructed similar to valve 151.

Ratio controls

The manually actuated ratio selector valve 161 connects the main line 104 selectively to each of the high, low and reverse drive motors under normal conditions. A manual control 162 is connected to actuate the valve element 163 which has lands *a*, *b*, *c* and *d* of equal diameter located in the bore 164. In the neutral position, main line 104 is blocked by the land *a* and the reverse line 166 is connected to exhaust 167, low feed line 168 is connected to exhaust 169 and the high feed line 171 is connected via transfer line 172 to exhaust 169. When the valve 163 is moved to the low position, main line 104 is connected between the lands *a* and *b* to the low feed line 168. Though the space between lands *a* and *b* is also connected to the transfer line 172, this line is blocked between the lands *c* and *d*. The reverse line 166 remains connected to exhaust 167 and the high line 171 is connected between *b* and *c* to exhaust 169. In the high position, line 104 is connected between lands *a* and *b* to transfer line 172 which is connected between lands *c* and *d* to high line 171. Reverse remains connected to exhaust 167 and low line 168 is connected between the lands *b* and *c* to exhaust 169. In the reverse position line 104 is connected between the lands *a* and *b* to reverse line 166. The low line 168 will be connected between lands *b* and *c* to transfer line 172 which re-enters the bore below land *d* to provide a connection to exhaust 173. The high line 171 is connected between the lands *c* and *d* to exhaust 169.

Inhibitor valves

The inhibitor valve over-controls the manual ratio control to prevent downshifting except at proper speeds. A governor which may be a gear type pump 176 driven from an output shaft 64 through the same gearing as the rear pump 91, draws fluid from the sump via the branch 177 of the rear pump supply line and supplies fluid to the governor 178. The governor line has an orifice 179 venting fluid to provide a governor pressure proportional to output or vehicle speed which is limited by relief valve 180.

The low range inhibitor valve 181 has a valve element 182 having lands $a$, $b$ and $c$ located in a bore 183. Land $c$ is preferably made smaller than lands $a$ and $b$ which are of equal diameter to provide hysteresis so that an upshift may occur at a higher speed, for example 12 m.p.h., while a downshift will occur at a lower speed, for example 10 m.p.h.

Both ends of the bore 183 are closed and at the upper end a spring 184 urges the valve to the open position shown connecting low feed line 168 between the lands $a$ and $b$ to the low brake line 186 to supply fluid to the low brake motor 42 to engage low brake 41. A passage 187 extends through the land $a$ to connect the low brake line 186 to the spring chamber portion of bore 183 to lock the valve in the open position whenever the low brake is engaged. With the low range inhibitor valve 181 in the open position shown, the relay valve signal line 189 is connected between lands $b$ and $c$ to exhaust 191. The governor pressure in line 178 is connected to the lower closed end of bore 183 to act beneath land $c$ to raise the valve against the biasing force of spring 184 to the closed position as limited by the abutment portion 192 of valve element 182. In this position, low brake line 186 and the spring chamber is connected to exhaust 188 to disengage the low brake, and the low feed line 168 is connected between lands $b$ and $c$ to the relay signal line 189. The fluid under pressure acting on the unbalanced area between lands $b$ and $c$ opposes spring 184 to effect a downshift at a lower speed, i.e., 10 m.p.h. Once the low brake is engaged, fluid passing through passage 187 to the spring chamber preferably holds the valve element 182 in the open position shown under all driving conditions and particularly for down hill braking. The governor pressure relief valve 180 may be set to permit governor pressure to rise sufficiently to upshift to high ratio as a safety measure to prevent excessive and unsafe drive train and engine speeds which would destroy the mechanical components. However, under normal driving and all effective engine braking conditions, it is not contemplated that inhibitor valve 181 will upshift once low low ratio has been engaged.

High clutch feed valve

The high clutch feed line 171 is connected to the high clutch feed or relay valve 196 which has a valve element 197 biased to the normal position by a spring 198 to connect the high clutch feed line 171 to the branch 201 of the high clutch line 202 and block the connection of branch 203 to signal line 189. Relay valve signal line 189 is connected to the opposite closed end of the bore and when fluid is supplied by the signal line, it moves the valve element 197 down to connect the signal line to the branch 203 of the high clutch feed line 202. Since branch 201 is then blocked by valve element 197, from possible exhaust via line 171 fluid will be supplied to the high clutch motor 42 to engage the high clutch. The high clutch feed valve thus acts as a relay valve to connect either the high clutch feed line 171 from manual selector valve 161 or the signal line 189 to the high clutch line 202 and functions in conjunction with inhibitor valve 181 to provide downshift inhibitor means.

Reverse inhibitor valve

The reverse inhibitor valve 206 has a valve element 207 having lands $a$ and $b$ of equal diameter located in a bore 208. The valve 207 is normally biased by a spring 209 to the open position shown connecting the reverse supply line 166 to the reverse brake 211. The exhaust 212 normally vents the chamber for spring 109. The governor pressure line 178 is connected to the bore 108 below the land $a$ of valve element 107 and at a speed above a predetermined low value, for example 5 m.p.h., moves the valve up to the closed position blocking reverse feed line 166 and connecting reverse line 211 to exhaust 214 to prevent engagement in reverse when there is an appreciable forward speed.

Operation of ratio controls

The selector valve in the neutral position shown connects each of the ratio drive mechanisms to exhaust to provide a positive neutral. In low ratio position of the manual valve, the main line 104 is connected to the low feed line 168. In high ratio position to the high feed line 171 and in reverse position to the reverse feed line 166. In each ratio position the other ratio feed lines are connected to exhaust as pointed out above. Under normal driving conditions when the speed of the vehicle is appropriate for shifting, the valves 181, 196 and 206 are in the position shown permitting manual shifting. The low feed line 168 will be connected through the low ratio inhibitor valve 181 to the low brake line 186. The high ratio feed line 171 will be connected through the high clutch feed valve 196 to the high clutch branch 201 and line 202 and the reverse feed line 166 will be connected through the reverse inhibitor valve 206 to the reverse brake line 211 so that all ratios may be actuated in accordance with the position of the manual selector valve.

When low ratio is engaged by supply fluid under pressure through the low feed line 168 to the low brake line 186, fluid also flows through passage 187 to the spring chamber of valve 181 to lock the valve in the open position shown to prevent automatic upshifting of the transmission in response to increasing vehicle speed. Thus, under all normal conditions, it is necessary to manually upshift from low to high ratio. When the transmission is operating in high ratio with the manual selector in the high ratio position, supplying fluid to the high feed line 171 through valve 196 to the branch 201 and high clutch line 202 to engage the high clutch, the transmission will not be downshifted in response to a manual downshift above a predetermined low speed value. The low feed line 168 is also connected at the selector valve to exhaust so that the fluid in the spring chamber of bore 183 drains through passage 187 to the selector valve permitting governor pressure acting on the land $c$ of valve element 182 to move the valve element against the spring biasing force. If the speed of the vehicle is excessive (above 12 m.p.h.) for low ratio drive, the valve element 182 will be raised to the closed position. Then on a manual shift from high to low ratio, fluid supplied to the low feed line 168 will be connected between the lands $b$ and $c$ of valve element 182 to the relay signal line 189 to move valve element 197 of the high clutch feed valve down to connect the signal line 189 via branch 203 to high clutch line 202 to maintain the high clutch engaged. This occurs before the high clutch is disengaged through lines 202, 201, valve 196, line 171 to exhaust 169 at the manual valve. When the speed of the vehicle decreases below a predetermined value, for example about 10 m.p.h., valve element 182 will be moved down by the spring 184 and fluid pressure on the unbalanced area of lands $b$ and $c$ to connect the low feed line 168 to the low brake line 186 to engage low ratio and at the same time to connect signal line 189 to exhaust 191. Then the spring 189 moves valve element 197 to the position shown connecting the high high clutch line 202 through valve 196 to an exhaust at the selector valve 161.

The reverse range inhibitor valve 206, when the vehicle speed exceeds a predetermined low value, i.e., 5 m.p.h. forward, will be upshifted to block reverse feed line 166 and connect reverse line 211 to exhaust 214 to prevent engagement of reverse drive. Below this forward speed or in all reverse speeds valve 209 is in the position shown connecting reverse feed line 166 to reverse line 211 to engage reverse.

The above described preferred embodiment is illustrative of the invention, and it will be appreciated that modifications may be made within the scope of the appended claims.

We claim:

1. In a transmission; a drive mechanism providing a sequence of first, second and third operating conditions sequentially increasing the speed of the output relative to the input including as second and third operating conditions low and high ratio drives and having low and high establishing means to establish said low and high ratio drives; manual control means movable between first, second and third positions; controlled means operatively connected to said manual control means and said low and high establishing means and operable in a first position of said manual control means to normally provide said first operating condition, in a second position of said manual control means to normally actuate said low establishing means to establish said low ratio drive and in a third position of said manual control means to actuate said high establishing means to establish said high ratio drive; a governor responsive to output speed; and overcontrol means operably connecting said governor to said controlled means operable on a shift from both said first and third positions to said second position at speeds above a predetermined speed to actuate said controlled means to prevent operation of said low establishing means and to provide for operation of said high establishing means for a shift to high ratio drive and at speeds below said predetermined speed to actuate said controlled means to operate said low establishing means to establish said low ratio and thereafter continue operation as speeds above and below, said predetermined speed.

2. The invention defined in claim 1 and said first operating condition being neutral.

3. The invention defined in claim 1 and said manual control means on a shift to said third position being operative to actuate said high establishing means to provide high ratio at speeds above and below said predetermined speed.

4. In a transmission, a drive mechanism providing a low and high ratio and having fluid operated means to engage said low and high ratio, a source of fluid under pressure, a low feed line, a high feed line, a signal line, a manual selector valve having a low position connecting said source to said low feed line and a high position connecting said source to said high feed line, a governor providing a governor pressure proportional to output speed, a low inhibitor valve having a first position connecting said low feed line to said low fluid operated means and a second position connecting said low fluid operated means to exhaust and said low feed line to said signal line biased to said first position and movable to said second position by a predetermined governor pressure, a high valve normally connecting said high feed line to said high fluid operated means and operative in response to pressure in said signal line to connect said signal line pressure to said high fluid operated means.

5. In a transmission, a drive mechanism providing a low and a high ratio drive and having a low and a high fluid operated means responsive to fluid under pressure to engage said low and high ratios, a source of fluid under pressure, a low feed line, a high feed line, a signal line, a manual control valve selectively operable in a first position to connect said source to said low feed line and in a second position to connect said source to said high feed line, a governor providing a fluid pressure proportional to the speed of the transmission output, a low inhibitor valve having blocking means operative in response to fluid pressure to block said low inhibitor valve in open position and biasing means biasing said valve to said open position connecting said low feed line to said low fluid operated means and said blocking means and connected to said governor for movement by a predetermined governor pressure against said biasing means to a closed position connecting said low fluid operated means and said blocking means to exhaust and connecting said low feed line to said signal line, a high relay valve biased to an open position connecting said high feed line to said high fluid operated means and connected to said signal line and responsive to signal line pressure to move said high relay valve to the closed position blocking said high feed line and connecting said source to said high fluid operated means.

6. In a transmission, a drive mechanism providing a low and high ratio drive and having a low and a high fluid operated means responsive to fluid under pressure to engage said low and high ratios, a source of fluid under pressure, a low feed line, a high feed line, a signal line, a manual control valve selectively operable in a first position to connect said source to said low feed line and in a second position to connect said source to said high feed line, a governor providing a fluid pressure proportional to the speed of the transmission output, a low inhibitor valve having blocking means operative in response to fluid pressure to block said low inhibitor valve in open position and biasing means biasing said valve to said open position connecting said low feed line to said low fluid operated means and said blocking means and connected to said governor for movement by a predetermined governor pressure against said biasing means to a closed position connecting said low fluid operated means and said blocking means to exhaust and connecting said low feed line to said signal line, a high relay valve biased to an open position connecting said high feed line to said high fluid operated means and connected to said signal line and responsive to signal line pressure to move said high relay valve to the closed position blocking said high feed line and connecting said signal line to said high fluid operated means.

7. In a transmission, a drive mechanism providing a low and high ratio and having fluid operated means to engage said low and high ratio, a source of fluid under pressure, a low feed line, a high feed line, a signal line, a manual selector valve having a low position connecting said source to said low feed line and a high position connecting said source to said high feed line, a governor providing a governor pressure proportional to output speed, inhibitor valve means having a first position connecting said low feed line to said low fluid operated means and a second position connecting said low fluid operated means to exhaust and said low feed line to said high fluid operated means biased to said first position and movable to said second position by a predetermined governor pressure, and having means responsive to pressure in said low feed line to hold said inhibitor valve means in said first position.

8. In a transmission, a drive mechanism providing a low and high ratio and having fluid operated means to engage said low and high ratio, a source of fluid under pressure, a low feed line, a high feed line, a signal line, a manual selector valve having a low position connecting said source to said low feed line and a high position connecting said source to said high feed line, a governor providing a governor pressure proportional to output speed, inhibitor valve means having a first position connecting said low feed line to said low fluid operated means and a second position connecting said low fluid operated means to exhaust and said low feed line to said high fluid operated means biased to said first position and movable to said second position by a predetermined governor pressure.

9. In a transmission, a drive mechanism providing a low and high ratio and having fluid operated means to engage said low and high ratio, a source of fluid under pressure, a low feed line, a high feed line, a signal line, a manual selector valve having a low position connecting said source to said low feed line and a high position connecting said source to said high feed line, a governor providing a governor pressure proportional to output speed, a low inhibitor valve having a first position connecting said low feed line to said low fluid operated means and a second position connecting said low fluid operated means to exhaust and said low feed line to said signal line biased to said first position and movable to said second position by a predetermined governor pressure, a high valve normally connecting said high feed line to said high fluid operated means and operative in response to pressure in said signal line to connect said source to said high fluid operated means.

10. In a transmission, a fluid drive device having an operating chamber, a source of fluid under pressure connected to said operating chamber, a cooler, a chamber outlet line connecting said chamber to said cooler, controlled flow restricting means, a cooler outlet passage connecting said cooler to said controlled flow restricting means, said controlled flow restricting means including a fixed restriction and bypass valve means having a normal closed position and operable by fluid under a predetermined pressure to open said bypass valve, and a signal line connecting said source to said bypass means.

11. In a transmission, a fluid drive device having an operating chamber, a source of fluid under pressure connected to said operating chamber, a cooler, a chamber outlet line connecting said chamber to said cooler, controlled flow restricting means, a sump, a cooler outlet passage connecting said cooler to said controlled flow restricting means, said controlled flow restricting means including a fixed restriction and bypass valve means having a normal closed position and operable by fluid under a predetermined pressure to open said bypass valve, a signal line connecting said source to said bypass means, and low pressure bypass means connecting said source to said chamber outlet line responsive to a predetermined low pressure to bypass fluid from said source to said chamber outlet line.

12. In a transmission, a fluid drive device having an operating chamber, a source of fluid under pressure connected to said operating chamber, a cooler, a chamber outlet line connecting said chamber to said cooler, controlled flow restricting means, a sump, a cooler outlet passage connecting said cooler to said controlled flow restricting means, said controlled flow restricting means including a fixed restriction and bypass valve means having a normal closed position and operable by fluid under a predetermined pressure to open said bypass valve, a signal line connecting said source to said bypass means, low pressure bypass means connecting said source to said chamber outlet line responsive to a predetermined low pressure to bypass fluid from said source to said chamber outlet line, and a check valve bypass means connecting said cooler outlet passage to said source to prevent the pressure in said cooler outlet passage being above the pressure of said source.

13. In a transmission, a fluid drive device having an operating chamber, a source of fluid under pressure connected to said operating chamber, a cooler, a chamber outlet line connecting said chamber to said cooler, controlled flow restricting means, a sump, a cooler outlet passage connecting said cooler to said controlled flow restricting means, and said controlled flow restricting means being operable by fluid under a predetermined pressure to provide an unrestricted passage.

14. The invention defined in claim 13 and low pressure bypass means connecting said source to said chamber outlet line responsive to a predetermined low pressure to bypass fluid from said source to said chamber outlet line, a check valve bypass means connecting said cooler outlet passage to said source to prevent the pressure in said cooler outlet passage being above the pressure of said source.

15. In a transmission, a first and a second fluid operated drive ratio means, a source of fluid under pressure, a regulator valve body having a bore with a closed end and spaced regulated fluid and exhaust ports, said regulated fluid port being connected to said source, a movable valve in said bore biased to a first position toward said closed end of said bore blocking flow from said regulated fluid port to said exhaust port having an unbalanced area subject to regulated fluid to move said valve to a second position connecting said regulated fluid port to said exhaust port, said movable valve having a longitudinal passage connected to said regulated fluid port at one end, and open at the other end at the end of said movable valve at said closed end of said bore, a movable piston located in said passage closing said other end and contacting said valve body, a check valve in said passage permitting rapid flow from said one end to said other end and means to permit a restricted exhaust from said passage between said check valve and said piston, a control valve selectively connecting said source to said first fluid operated drive means and said closed end of said valve bore to reduce the main line pressure in said first drive and to said second fluid operated drive means for said second drive.

16. In a transmission, a drive train including a torque converter having an operating chamber and a gear unit having a first and a second fluid operated drive ratio means, a source of fluid under pressure, a regulator valve body having a bore with a closed end and spaced regulated fluid and exhaust ports, said regulated fluid port being connected to said source, said exhaust port being connected to supply fluid to said chamber, a cooler, a converter outlet regulator valve, a first passage connecting said chamber to said cooler, a second passage connecting said cooler to said converter outlet regulator valve, a low pressure check valve connecting said regulated fluid port to said first passage to limit the pressure drop in said converter chamber, a one-way valve connecting said second passage to said regulated fluid port to limit pressure in said cooler, a movable valve in said bore biased to a first position toward said closed end of said bore blocking flow from said regulated fluid port to said exhaust port having an unbalanced area subject to regulated fluid to move said valve to a second position connecting said regulated fluid port to said exhaust port, said movable valve having a longitudinal passage connected to said regulated fluid port at one end, and open at the other end at the end of said movable valve at said closed end of said bore, a movable piston located in said passage closing said other end and contacting said valve body, a check valve in said passage permitting rapid flow from said one end to said other end and means to permit a restricted exhaust from said passage between said check valve and said piston, and control means having a manual valve operable in a first position to connect said regulated fluid pressure port to said first fluid operated means to engage a first ratio and in a second position to connect said regulated fluid pressure port to said second fluid operated means to engage a second ratio regardless of transmission speed and to connect said regulated fluid port to said closed end of said valve bore to reduce the main line pressure and automatic means to prevent engagement of said first fluid operated means on movement of said manual valve above a predetermined speed.

References Cited by the Examiner

UNITED STATES PATENTS

| | | | |
|---|---|---|---|
| 2,558,976 | 7/51 | O'Leary | 60—54 |
| 2,750,018 | 6/56 | Dundore | 60—54 |
| 2,919,597 | 1/60 | Borman | 74—472 |
| 2,926,543 | 3/60 | Holdeman et al. | 74—472 |
| 2,950,629 | 8/60 | Holdeman et al. | 74—472 |
| 2,952,267 | 9/60 | Reis | 137—115 |
| 2,985,186 | 5/61 | Mennesson | 137—115 |
| 3,027,783 | 4/62 | Kelley | 74—752 |

DON A. WAITE, *Primary Examiner.*